United States Patent

Barsotti et al.

[11] Patent Number: 5,985,956
[45] Date of Patent: Nov. 16, 1999

[54] CRACK-RESISTANT ONE-PACKAGE COATING COMPOSITION

[75] Inventors: Robert John Barsotti, Franklinville; Ying Kao Lee, Cherry Hill, both of N.J.; Laura Ann Lewin, Wilmington, Del.

[73] Assignee: E. I. du Pont de Nemours and Company, Wilmington, Del.

[21] Appl. No.: 08/894,161

[22] PCT Filed: Feb. 14, 1996

[86] PCT No.: PCT/US96/02161

§ 371 Date: Aug. 13, 1997

§ 102(e) Date: Aug. 13, 1997

[87] PCT Pub. No.: WO96/25466

PCT Pub. Date: Aug. 22, 1996

[51] Int. Cl.⁶ .............................. C08K 3/20; C08L 63/02
[52] U.S. Cl. ........................................ 523/435; 428/418
[58] Field of Search .............................. 523/435; 428/418

[56] References Cited

U.S. PATENT DOCUMENTS

| | | | |
|---|---|---|---|
| 4,247,439 | 1/1981 | Matthews et al. | 260/29.6 |
| 4,600,737 | 7/1986 | Georgalas et al. | 523/414 |
| 4,681,811 | 7/1987 | Simpson et al. | 428/413 |
| 4,746,714 | 5/1988 | Spinelli et al. | 525/286 |
| 4,755,581 | 7/1988 | Blackburn et al. | 528/93 |
| 4,871,806 | 10/1989 | Shalati et al. | 525/108 |
| 4,975,488 | 12/1990 | Furukawa et al. | 525/100 |
| 5,069,767 | 12/1991 | Tominaga | 204/181.7 |
| 5,369,153 | 11/1994 | Barsotti | 523/429 |
| 5,466,752 | 11/1995 | Barsotti et al. | 525/65 |

FOREIGN PATENT DOCUMENTS

| | | |
|---|---|---|
| 0 212 457 | 6/1986 | European Pat. Off. . |
| 0 353 734 | 2/1989 | European Pat. Off. . |
| WO 93/13111 | 7/1993 | WIPO . |
| WO 95/27760 | 10/1995 | WIPO . |

*Primary Examiner*—Robert Dawson
*Assistant Examiner*—D. Aylward
*Attorney, Agent, or Firm*—James A. Costello; Sudhir G. Deshmukh

[57] ABSTRACT

An organic solvent-containing coating composition useful as a finish for automobiles and trucks in which the film-forming binder comprises a component having at least two acid groups, a polymer having both epoxy and silane functionality and an acrylic-core polymer having stabilizer components soluble in the solvent.

10 Claims, No Drawings

CRACK-RESISTANT ONE-PACKAGE COATING COMPOSITION

BACKGROUND OF THE INVENTION

1. Field of the Invention

This invention pertains to a coating composition comprising acid group-containing oligomer, a polymer containing epoxy and silane functionality and an acrylic polymer component containing an ethylenically unsaturated monomeric element.

2. Description of the Prior Art

A problem with present coating compositions for certain metal substrates including those employed for automobiles and trucks, or parts thereof, is that durability is not as good as desired. An important aspect of durability is environmental resistance. The present invention offers a high quality finish exhibiting superior environmental resistance. Another problem with epoxy-containing systems has been that, due to limited pot life, they have been used as a two-package system, which packages are conventionally mixed shortly before use. The present composition is a one-package system characterized by good package stability and excellent crack resistance in use.

SUMMARY OF THE INVENTION

This invention pertas to a stable, crack-resistant, one-package coating composition with a volatile organic content of less tand or equal to 4.2 pounds per gallon comprising a volatile organic solvent and a binder, the binder comprising (by weight of binder):

(i) 2 to 35 percent of an organic compound having at least two acid groups and a weight average molecular weight of no more than about 2,000;

(ii) 25 to 95 percent of a polymeric component having both epoxy and silane functionality and a weight average molecular weight between 1,500 and 50,000 comprising about 0.5 to 1.7 equivalents of epoxy per equivalent of acid in (i), the silane being at least 2 percent by weight of the binder; and (iii) 3 to 40 percent of an acrylic component comprising a core of acrylic polymer and, grafted thereto, a plurality of substantially linear stabilizer components; component (iii) containing at least about 2 percent of ethylenically unsaturated monomer with finctionality capable of reacting with (i), (ii), or both (i) and (ii); the core being substantially insoluble and the stabilizer components being soluble in the solvent.

The composition can also be pigmented to form a colored finish, although the composition is especially useful as a clearcoat.

Preferred component (i) is the reaction product of methylhexahydrophthalic anhydride and pentaerythritol. Preferred component (ii) comprises polymerized units, in addition to glycidyl methacxylate and methacryloxypropyltrimethoxy silane, selected from at least one member of the group alkyl methacrylate, alkylacrylate and styrene, wherein the alkyl moiety contains 1 to 8 carbon atoms. Preferred component (iii) contains finctional monomer selected from at least one member of the group hydroxyethylacrylate, hydroxypropyl acrylate, glycidyl methacrylate and glycidyl acrylate.

DETAILS OF THE INVENTION

The coating composition of this invention has a solids content of between 40% to 80% binder, based on the weight of the binder/solvent composition. Preferably, the binder will comprise at least about 50% by weight of the composition.

Compound (i)

Contemplated as usefui oligomeric compounds are the reaction products of an acid anhydride such as hexahydrophthalic anhydride, or methylhexahydrophthic anhydride, or a succinic anhydride which can be substituted for example with a $C_1$–$C_8$ alkyl group, with a dihydroxyl finctional or polyhydroxyl functional compound such as pentaerythritol or ethylene glycol. A preferred half ester is the reaction product of methylhexahydrophthalic anhydride and pentaerythritol. Other hydroxy finctional compounds are trimethylolpropane, ditrimethyol propane, cyclohexane dimethanol, and hydrogenated bisphenol A.

Other compounds containing the requisite acid finctionality can be used such as glutaric acid and the like provided the volatility is such that they remain in the film during the curing process and can react in. The acid oligomer can have hydroxyl functionality, for example the reaction product of a 3:1 molar ratio of methylhexylhydrophthalic anhydride and pentraexthritol.

Polymeric Component (ii)

The epoxy- and silane-containing polymer can be made by the copolymerization of an ethylenically unsaturated epoxy-containing monomer and ethylenically unsaturated silane-contining monomer, optionally with compatible non-silane-containing comonomer(s). Ranges are 0 to 40% for the epoxy and 0 to 60% for the silane. Suitable non-silane-containing monomers are alkyl acrylates and methacrylates as well as styrene, methyl styrene, acrylamide, acrylonitrile, methacrylonitrile, and the like. In addition to alkyl acrylates or methacrylates, other non-silane-containing polymerizable monomers up to about 40% by weight of the polymer, can be employed for the purpose of achieving desired physical properties such as hardness, appearance, mar resistance, and the like.

A suitable silane-containing monomer for copolymerization with an epoxy-containing monomer is an alkoxysilane having the following structural formula:

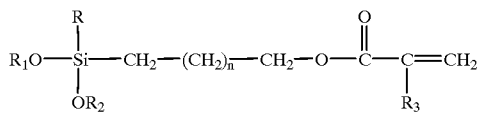

wherein R is either $CH_3$, $CH_3CH_2$, $CH_3O$, or $CH_3CH_2O$; $R_1$ and $R_2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical useful alkoxysilanes are the acrylatoalkoxy silanes, such as gamma acryloxypropyltrimethoxy silane and the methacrylatoalkoxy silanes, such as gamma-ethacryloxypropyltrimethoxy silane, and gamma-methacryloxypyropyltris(2-methoxyethoxy)silane. Other suitable alkoxysilane monomers have the following structural formula:

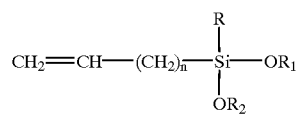

wherein R, $R_1$ and $R_2$ are as described above and n is a positive integer from 1 to 10.

Examples of such alkoxysilanes are the vinylalkoxy silanes, such as vinyltrimethoxy silane, vinyltriethoxy silane and vinyltris(2-methoxyethoxy) silane. Other suitable silane-containing monomers are acryloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane. Of course, mixtures of these silane-containing monomers are also suitable.

A contemplated acrylosilane monomer contains about 30% by weight styrene, about 50% by weight methacryloxypropyltrimethoxy silane, and about 20% by weight of nonfunctional acrylates or methacrylates such as trimethylcyclohexyl methacrylate, butyl acrylate, and iso-butyl methacrylate and any mixtures thereof.

Silane-functional monomers also can be used in forming the silane polymer. These macromonomers are the reaction product of a silane-containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy-functional ethylenically unsaturated monomer such as a hydroxyalkyl acrylate or methacrylate having 1 to 4 carbon atoms in the alkyl group and an isocyanatoalkyl alkoxysilane such as isocyanatopropyl triethyoxysilane. Typical of such silane-functional macromonomers are those having the following formula:

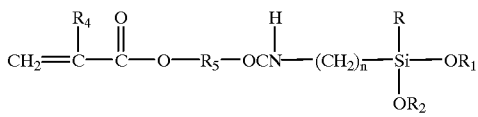

wherein R, $R_1$, and $R_2$ are as described above; R4 is H or $CH_3$, $R_5$ is an alkylene group having 1 to 8 carbon atoms and n is a positive integer from 1 to 8.

In one embodiment of the present invention, the silane polymer optionally also has epoxy groups, that is, a portion of the monomers reacted to form the polymer contain an epoxy group. An example of a suitable epoxy finctional monomer is glycidyl methacrylate and the like. Suitably, the silane polymer can be the reaction product of a monomer mixture comprising up to 40% by weight of an epoxy finctional monomers, preferably 10 to 30%, and most preferably 15 to 30% by weight of an epoxy functional monomer and up to 60% silane finctional monomer, preferably 10 to 40% and most preferably 20 to 30%.

The binder of the present composition can fuirther comprise from about 2 to 20%, preferably 2 to 5%, based on the weight of the binder, of an acrylic or polyester or a polyester urethane or copolymer thereof having a hydroxy number of about 20 to 300, preferably 50 to 200, most preferably 120 to 175. A typical acrylic polymer is comprised of polymerized monomers of alkyl acrylates, alkyl methacrylates, hydroxyalkyl acrylates and hydroxy alkyl methacylate and styrene.

Acrylic Component (iii)

Polymers dispersed in organic (substantially non-aqueous) medium have been variously referred to, in the art, as a non-aqueous dispersion (NAD) polymer, a microgel, a non-aqueous latex, or a polymer colloid.

In general, dispersed acrylic component (iii) is a polymer particle dispersed in an organic media, which particle is stabilized by what is known as steric stabilization. Hereafter, the dispersed phase or particle, sheathed by a steric barrier, will be referred to as the "macromolecular polymer" or "core".The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 microns. The arms, attached to the core, make up about 90 to 10%, preferably 20 to 59%, by weight of the dispersed polymer, and have a weight average molecular weight of about 1,000 to 30,000, preferably 1,000 to 10,000.

The macromolecular core of the dispersed polymer is comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (transition glass temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitdle. Optionally, the macromolecular core can be crosslinked through the use of diacrylates or dimethacrylates such as allyl methacrylate or post reaction of hydroxyl moieties with polyfunctional isocyanates.

The dispersed polymers of Component (iii) comprise macromonomer arms which contain finctional groups adapted to react with the acrylic core polymer. It is not known with certainty what portion of these functional groups react with the core polymer because of the numerous and complicated sets of reactions which occur during curing of the composition, especially if additional film-fomwing binders are present. However, a substantial portion of these functionalities in the arms react and crosslink with the film-former of the composition which in some cases may exclusively consist of an organosilane polymer.

The arms of the dispersed polymer are anchored securely to the macromolecular core. For this reason, the arms preferably are anchored by covalent bonds. The anchoring is sufficient to hold the arms to the dispersed polymer after they react with the film-former polymer. For this reason, the conventional method of anchoring by absorption of the backbone portion of a graft polymer may provide insufficient anchoring.

The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

A preferred composition for a dispersed polymer that has hydroxy finctionality comprises a core consisting of about 25% by weight hydroxy ethyl acrylate, about 4% by weight methacrylic acid, about 46.5% by weight methyl methacrylate, about 18% by weight methyl acrylate, about 1.5% by weight glycidyl methacrylate and about 5% styrene. The macromonomer attached to the core contains 97.3% by weight prepolymer and about 2.7% by weight glycidyl methacrylate, the latter for crosslinking or anchoring.

A preferred prepolymer contains about 28% by weight of butyl methacrylate, about 15% by weight of ethyl methacrylate, about 30% by weight of butyl acrylate, about 10% by weight of hydroxyethyl acrylate, about 2% by weight of acrylic acid, and about 15% by weight of styrene.

The dispersed polymer can be produced by conventional procedures such as dispersion polymerization in an organic solvent, in the presence of a steric stabilizer for the particles. The procedure is one of polymerizing the monomers in an inert solvent in which the monomers are soluble but the resulting polymer is not soluble, in the presence of a dissolved amphoteric stabilizig agent. the macromonomer arms can be prepared by cobalt catalyzed special chain transfer (SCT) polymerization, group transfer polymerization (GTP), or free-radical polymerization.

Optional Ingredients

The composition of this invention can additionally contain small amounts of adjuvants and other materials that will not interfere with the reaction of components (i), (ii), and (iii). For instance, curing catalysts can be employed in amounts of 0.1 to 5 percent by weight of the composition for crosslinking silane moieties of a silane polymer and other components of the composition. Such catalysts include dibutyl tin dilaurate, dibutyl tin diacetate, dibutyl tin dichloride, dibutyl dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, and other such catalysts or mixtures thereof known to those skilled in the art.

Tertiary amines, acids and the like, are also useful for catalyzing silane bonding. For example, dodecylbenzene sulphonic acid (DDBSA) or paratoluene sulfonic acid blocked by amines such as aminomethyl propanol, diisopropanolamine or dimethylethanol amine. Additional catalyst for the epoxy acid reaction can be used. For instance, triethylene diamine, quinuclinidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)propan-2-ol, $N,N,N^1,N^1$-tetramethylethylenediamine, N-methyldiethanolamine, N,N-dimethyl-1,3-propanediamine and 1-dimethylamino-2-propanol or quaternary ammonium salts such as tert-butyl ammonium bromide, benzyl timethyl ammonium formate and phosphonium compounds such as tetra butylphosphonium chloride or benzyltriphenyl phosphonium chloride.

The present coating composition can include a monomeric or polymeric alkylated melamine formaldehyde resin that is partially or fullly alkylated. One such crosslinking agent is a methylated and butylated or isobutylated melamine formaldehyde resin that has a degree of polymerization of about 1 to 3. Generally, this melamine formaldehyde resin contains about 50% butylated groups or isobutylated groups and 50% methylated groups. Such crosslinking agents typically have a number average molecular weight of about 300 to 600 and a weight average molecular weight of about 500 to 1500. Preferably, the crosslinking agent is used in the amount of about 1 to 20%, most preferably 4 to 10% by weight, based on the weight of the bmder of the composition. Polymeric melamines are preferred because they are catalyzed by weak acids such as carboxylic acids versus strong acids such as sulfonic acids and are not hindered by amines. Other crosslinking agents are urea formaldehyde, benzoguanamine formaldehyde and blocked polyisocyanates.

To improve weatherability of a clear finish produced by the present coating composition, an ultraviolet light stabilizer or a combination of ultraviolet light stabilizers can be added in the amount of about 0.1 to 5% by weight, based on the weight of the binder. Such stabiizer include ultraviolet light absorbers, screeners, quenchers, and specific hindered amine light stabilizers. An antioxidant can be added in the amount of about 0.1 to 5% by weight, based on the weight of the binder. Typical ultraviolet light stabilizers include benzophenones, triazoles, triazines, benzoates, hindered amines and mixtures thereof.

The composition can also contain other conventional formulation additives such as flow control agents, for example, polybutylacrylate and high molecular weight polyacrylates; rheology controls agents, such as fused silica; water scavengers such as tetrasilicate, trimethyl orthoformate, triethyl orthoformate, and the like.

The composition can also contain an additional oligomeric epoxy additive. Typical glycidyl components are sorbitol polyglycidyl ether, mannitol polyglycidyl ether, pentaerytlritol polyglycidol ether, glycerol polyglycidyl ether, low molecular weight epoxy resins such as epoxy resins of epichlorohydrin and bisphenol A, di- and polyglycidyl esters of acids, polyglycidyl ethers of isocyanaurates and sorbitol polyglycidyl ethers, such as di- and polyglycidyl esters.

When the present coating composition is used as a basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and the like.

The pigments can be introduced into the coating composition by first forming a mlll base or pigment dispersion with any of the aforementioned polymers used in the coating composition or with another compatible polymer or dispersant by conventional techniques, such as high speed mixing, grinding and milling. The mill base is then blended with the other constituents used in the coating composition.

Conventional solvents and diluents are used to dissolve or disperse the components of the present coating composition. Typical solvents and diluents include toluene, xylene, butyl acetate, acetone, methyl isobutyl ketone, methyl ethyl ketone, methanol isopropanol butanol hexane, acetone, ethylene glycol, monoethyl ether, mineral spirits, heptane and other aliphatic, cycloaliphatic, aromatic hydrocarbons, esters, ethers, ketones, and the like.

It is contemplated that the coatings of this invention can be used on a wide variety of metallic and non-metallic substrates, particularly where durability, etch-resistance and mar-resistance is important. The coatings can be applied by conventional techniques such as spraying, electrostatic spraying, dipping, brushing, flowcoating and the like. The preferred techniques are spraying and electrostatic spraying. After application, the composition is typically baked at 100 to 150° C. for about 15 to 30 minutes to form a coating about 0.1 to 3.0 mils thick. When the composition is used as a clearcoat, it is applied over the colorcoat which can be dried to a tack-free state and cured or preferably flash dried for a short period before the clearcoat is applied. The colorcoat/clearcoat finish is then baked to provide a dried and cured finish.

It is customary to apply a clear topcoat over a basecoat by means of a "wet-on-wet" application in which the topcoat is applied over the basecoat without curing or completely drying the basecoat. The coated substrate is then heated for a predetermined time period to allow simultaneous curing of the base and clear coats. When waterborne basecoats are used, the basecoat is subjected to a warm air flash to remove water before the clear is applied.

EXAMPLES

Ingredient workup was conducted in a 25-liter reactor. In these Examples, the following descriptions apply to the recited ingredients and their preparation:

Acid Oligomer No. 1(i)

These ingredients (in parts by weight to the nearest whole number) were charged to a reactor and heated for 15 minutes at 120° C.:

| | |
|---|---|
| propylene glycol monomethyl ether acetate (PM acetate) | 85 |
| triethylamine | 0.07 |
| pentaerythritol | 35 |

The following was added to the reactor over 15 minutes: methyl hexahydrophthalic anhydride (164) and heat was applied for 3 hours at 120° C. The disappearance of anhydride was monitored using IR. When 95+% of the anhydride was reacted, the reactor was cooled and the product discharged.

Acid Oligomer No. 2 (i)

This ingredient (in parts by weight) was charged to a reactor and heated at 70° C.:

| | |
|---|---|
| propylene glycol monomethyl ether acetate (PM acetate) | 121 |

The following materials were heated to 120° C. and mixed for 15 minutes to dissolve:

triethylamine 0.07
hexanediol 61 and then added to the reactor over 15 to 30 minutes. They were held at 120° C. for 2 hours. To the reactor was then added:

| | |
|---|---|
| methyl hexahydrophthalic anhydride | 164 | and the disappearance of anhydride was monitored using IR. When 95+% of the anhydride was reacted, the reactor was cooled and discharged.

Epoxy Polmer (ii)

An epoxy finctional polymer was prepared by charging the following constituents into a polymerization vessel equipped with a heating mantle, reflux condenser, thermometer, nitrogen inlet, and stirrer:

| | Parts by Weight |
|---|---|
| Portion 1 | |
| xylol (135° to 145° C.) | 1371 |
| Portion 2 | |
| glycidyl methacrylate | 868 |
| butyl methacrylate | 651 |
| butyl acrylate | 326 |
| aromatic hydrocarbon solvent | 150 |
| styrene | 326 |
| Portion 3 | |
| t-butyl peroxyacetate | 110 |
| aromatic hydrocarbon | 200 |

Portion 1 was charged into the polymerization vessel and heated to reflux under nitrogen. Portion 2 was then added to the vessel over 360 minutes and Portion 3 over 390 minutes. After the addition of Portion 3 was completed, the reaction mixture was held at reflux for 30 minutes and then 791 grams of solvent was removed by distillation. The resulting polymer solution had the following characteristics:

| | |
|---|---|
| Percent weight solids: | 70 |
| Mw of polymer: | 3600 |
| Mn of polymer: | 1750 |
| Polymer Composition: | BMA/STY/BA/GMA |
| | 30  15  15  40 |

Epoxy Silane Polymer (ii)

An epoxy-silane polymer, more particularly an epoxy functional acrylosilane polymer, was prepared by charging the following constituents into a polymerization vessel equipped with a heating mantle, reflux condenser, thermometer, nitrogen inlet, and stirrer:

| | Parts by Weight |
|---|---|
| Portion 1 | |
| Xylol (135° to 145° C.) | 291 |
| aromatic hydrocarbon solvent | 361 |
| Portion 2 | |
| styrene | 594 |
| gamma-methacryloxypropyl trimethoxy silane | 594 |
| isobutyl methacrylate | 831 |
| glycidyl methacrylate | 356 |
| aromatic hydrocarbon | 82 |
| Portion 3 | |
| free radical catalyst (VAZO 67) | 189 |
| aromatic hydrocarbon | 259 |

Portion 1 was charged into the polymerization vessel and heated under nitrogen to 149° C. Portion 2 was then added over 360 minutes and Portion 3 over 420 minutes to the vessel. The resulting polymer solution had the following characteristics:

Percent weight solids: 69

Mw of polymer: 3100

Mn of polymer: 1500

The polymer composition was, by weight, 25 percent styrene, 25 percent gamma-methacryloxylpropyl trimethoxy silane commercially available from OSi Specialities, 35 percent isobutyl methacrylate and 15 percent glycidyl methacrylate.

Nonaqueous Dispersion No. 1 (acrylic component iii)

To a 5-liter flask fitted with an agitator, thermometer, condenser and addition fimnels was added the following ingredients. The mixture was agitated under nitrogen and temperature raised to reflux (100 to 104° C.). Ingredients are given in parts by weight (to the nearest whole number, for most). The dispersed polymer is 63.5% weight solids in toluene having a weight average molecular weight of 8100. The composition was as follows:

STY/BA/BMA/HEA/MAA/GMA (14.7/43.6/27.5/10.1/2.3/1.7).

| | |
|---|---|
| dispersed polymer | 206 |
| isopropanol | 12 |
| spirits | 94 |
| heptane | 53 |
| butanol | 3 |

Added as a shot at reflux was t-butyl peroctoate (0.5 parts) and mineral spirits (5 parts). Then, the following ingredients were added over a 210 minute period at reflux:

| | |
|---|---|
| styrene | 52 |
| hydroxy ethylacrylate | 86 |
| methyl methacrylate | 126 |
| glycidyl methacrylate | 5 |
| methacrylic acid | 14 |
| methyl acrylate | 62 |
| dispersed polymer | 103 |

These ingredients were added next and the reaction held for 45 minutes:

| | |
|---|---|
| butanol | 12 |
| heptane | 17 |
| t-butyl peroctoate | 5 |
| mineral spirits | 31 |

Butanol (16 parts) and t-butyl peroctoate (1.7 parts) were then added over a 30 minute period and the reaction was held for 60 minutes. Finally, the reactor was stripped of 76 parts of solvent. The particle size was 298 nm as measured by quasielastic light scattering and had a room temperature viscosity of 2000 centipoise at 5 rpm on a Brookfield viscometer and a weight solids of 63.5 percent.

Nonaqueous Dispersion No. 2 (stabilized acrylic resin iii)

Cobalt Macromonomer

To a 2-liter flask fitted with an agitator, condenser, heating mantle, nitrogen inlet, thermocouple and an addition port was added 81.29 grams of butyl methacrylate, 243.88 grams of 2-ethyl hexyl methacrylate, 81.29 grams of glycidyl methacrylate, 210 grams of toluene and 50.1 grams of butyl acetate. The mixture was agitated and heated to reflux (135°–140° C.) under nitrogen. To this was then added, in one portion, a pre-mix of a solution of 0.35 grams of Vazo® 88, 13.8 grams of toluene and 17.2 grams of of a 0.17% solution of bis(Boron Difluoro Diphenyl Glyoximato Cobaltate (II)) in methyl ethyl ketone. This was followed by the addition of a pre-mix of a solution of 71.34 grams of butyl methacrylate, 214.02 grams of 2-ethyl hexyl methacrylate, 71.34 grams of glycidyl methacrylate, 1.35 grams of Vazo® 88 [1,1-azobis(cyanocyclohexane)] and 86.8 grams of toluene over 240 minutes while maintaining reflux (116°–122° C.). Following a 30 minute hold period, a pre-mixed solution of 0.32 grams of Vazo® 88 and 23.0 grams of toluene was added over 60 minutes while maintaining reflux. The batch was then held at reflux for an additional 60 minutes at which time a mixture of 0.23 grams of t-butyl peroctoate and 31.5 grams of of butyl acetate was added in one portion and the reaction mixture was then cooled. The macromonomer thus prepared has a number average molecular weight of 3400 and a weight average molecular weight of 5500 as determined by GPC. Weight solids are 63.6% and Gardner viscosity F. The percent terminal vinyl unsaturation is >95 as determined by thermogravimetric analysis.

Preparation of Stabilized Acrylic Resin

To a 2-liter flask fitted with an agitator, condenser, heating mantle, nitrogen inlet, thermocouple and an addition port was added 222.32 grams of cobalt macromonomer prepared above and 394.4 grams of heptane and the temperature raised to reflux (95° C.) under nitrogen at which time 0.55 grams of t-butyl peroctoate was added in one portion. This was followed by the addition of a premixed solution of 96.63 grams of methyl methacrylate, 59.16 grams of styrene, 47.33 grams of hydroxy ethyl acrylate, 70.99 grams of methyl acrylate, 39.44 grams of acrylonitrile, 1.97 grams of allyl methacrylate, 78.88 grams of glycidyl methacrylate, 110.43 grams of cobalt macromonomer formed above, 5.92 grams of t-butyl peroctoate and 63.7 grams toluene over 210 minutes holding reflux at 95° C. This was followed by a hold period of 45 minutes at reflux at which time a premixed solution of 3.94 grams of t-butyl peroctoate and 28 grams of toluene was added over 30 minutes while maintaining reflux. The reaction mixture was then held at reflux for 60 minutes followed by distillation of 78.88 grams of solvent to raise weight solids to 54%. Particle size as measured by quasi elastic light scattering was 206 nanometers. Gardner Holdt viscosity was A2.

Dual Crosslinked Stabilized Acrylic Resin

To a 2-liter flask fitted with an agitator, condenser, heating mantle, nitrogen inlet, thermocouple and an addition port was added 500 grams of stabilized acrylic resin prepared above and the temperature raised to 90° C. at which time 12.5 grams of DES3390® isocyanate [triisocyanurate of 1,6-hexamethylene diisocyanate (Miles)] and 5 grams of methyl ethyl ketone was added over 10 minutes. The reaction mixture was held at 90° C. for 4 hours until all the isocyanate had been consumed as measured by IR, then 45 grams of solvent was distilled to raise weight solids to 60% and the reaction mixture was cooled. The crosslinked stabilized acrylic resin had a Gardner Holdt viscosity of J.

Adjuvants and Other Recipe Ingredients

Microgel

Step 1.

In a 5-liter reactor, the following ingredients were combined with amounts indicated in parts by weight (most are rounded to the nearest whole number). The following materials were heated to reflux and held for 60 minutes:

| | |
|---|---|
| mineral spirits | 98 |
| heptane | 74 |
| methyl methacrylate | 15 |
| polymer* | 4.7 |
| VAZO free radical catalyst | 1.4 |

*The polymer is made from 12-hydroxy stearic acid (43.6), MMA (45.9), MAA (0.9) and GMA (9.6) at 40% weight solids in toluene with a weight average molecular weight of 19,000.

Step 2.

The following materials were added over 180 minutes maintaining the reflux, then held 120 minutes:

| | |
|---|---|
| methyl methacrylate | 179 |
| styrene | 75 |
| hydroxyethylacrylate | 23 |
| glycidyl methacrylate | 2.8 |
| methacrylic acid | 2.8 |
| polymer (see above) | 58 |
| mineral spirits | 32 |
| heptane | 191 |
| N,N-dimethyl ethanolamine | 1.1 |

Step 3.

The product was rinsed with heptane and then the following was added as in Step 2:

| | |
|---|---|
| toluene | 13 |
| heptane | 30 |
| VAZO 67 | 2.0 |
| 2,2'-azobis(2-methylbutanenitrile) | |

Step 4.

The product was rinsed with heptane and stripped of 246 parts of solvent. Finally, 246 parts of melamine was added to the cooled reactor to produce the microgel.

Screeners Solution

| | |
|---|---|
| xylene | 68 |
| TINUVIN 900 | 8 |
| TINUVIN 123 | 12 |
| TINUVIN 1130 | 13 |

Blocked DDBSA

| Blocked DDBSA | |
|---|---|
| methanol | 41 |
| dodecylbenzene sulphonic acid | 48 |
| 2-amino-2-methyl-1-propanol | 11 |
| 25% Phosphonium | |
| tetrabutyl phosphonium chloride | 25 |
| propylene glycol monoethyl ether acetate (PM acetate) | 75 |

Melamine BM 9539 is a butylated melamine available from Monsanto. Melamine CYMEL 325 is a methylated melamine available from Cytec. RESIFLOW S is a flow control agent available from Estron Chemicals. The TINUVINS are available from Ciba-Geigy.

| Silica Dispersion | |
|---|---|
| xylene | 35 |
| n-butanol | 20 |
| acrylic polymer | 36 |
| AEROSIL R805 silica (Degussa) | 9 |

The above was passed two times through a sand mlll and then filtered through a 10 micron screen.

Example 1

The recipe for a coating composition of this invention, one employing no tin catalyst, is as follows with amounts given in percentages by total weight.

| | |
|---|---|
| acid oligomer No. 1 (i) | 9.9 |
| epoxy polymer (ii) | 5.5 |
| microgel | 3.9 |
| melamine BM 9539 | 2.4 |
| screeners solution for durability | 6.3 |
| Nonaqueous dispersion No. 1 (iii) | 16.1 |
| RESIFLOW S flow additive | 0.2 |
| silica dispersion | 5.8 |
| trimethylortho acetate (water scavenger) | 2.3 |
| epoxy silane polymer (ii) | 34.1 |
| aromatic hydrocarbon solvent | 11.4 |
| n-butanol solvent | 2.1 |

Example 2

The recipe for a coating composition of this invention employing no additional epoxy component is as follows (in percentages by total weight).

| | |
|---|---|
| acid oligomer No. 1 | 8.6 |
| microgel | 4.1 |
| melamine BM 9539 | 2.5 |
| screeners solution | 6.5 |
| nonaqueous dispersion No. 1 (iii) | 16.6 |
| RESIFLOW S | 0.3 |
| blocked DDBSA | 0.3 |
| silica dispersion | 6.0 |
| trimethylortho acetate | 2.4 |
| dibutyltin dilaurate | 0.1 |
| 25% phosphonium | 0.2 |
| epoxy silane polymer (ii) | 42.2 |
| aromatic hydrocarbon solvent | 8.2 |
| n-butanol | 2.1 |

Example 3

The recipe for a coating composition of this invention employing glycidyl methacrylate nonaqueous dispersion is as follows in percentages by total weight.

| | |
|---|---|
| acid oligomer No. 1 (i) | 9.9 |
| epoxy polymer (ii) | 5.4 |
| microgel | 3.9 |
| melamine BM 9539 | 2.4 |
| screeners solution | 6.3 |
| nonaqueous dispersion No. 2 (iii) | 18.0 |
| RESIFLOW S | 0.2 |
| blocked DDBSA | 0.3 |
| silica dispersion | 5.8 |
| trimethylortho acetate (scavenge water) | 2.3 |
| dibutyltin dilaurate | 0.1 |
| 25% phosphonium | 0.3 |
| epoxy silane polymer (ii) | 34.0 |
| aromatic hydrocarbon solvent | 10.6 |
| n-butanol | 0.4 |

Example 4

The recipe for a coating composition employing mixed acid components is as follows in percentages by total weight.

| | |
|---|---|
| acid oligomer No. 1 (i) | 5.2 |
| acid oligomer No. 2 (i) | 5.2 |
| epoxy polymer | 5.4 |
| microgel | 3.9 |
| melamine BM 9539 | 2.4 |
| screeners solution | 6.2 |
| non aqueous dispersion No. 1 (iii) | 15.9 |
| RESIFLOW S | 0.2 |
| blocked DDBSA | 0.3 |
| silica dispersion | 5.8 |
| trimethylortho acetate (scavenge water) | 2.3 |
| dibutyltin dilaurate | 0.1 |
| 25% phosphonium | 0.3 |
| epoxy silane polymer (ii) | 33.2 |
| aromatic hydrocarbon solvent | 12.0 |
| n-butanol | 1.8 |

Example 5

The recipe for a coating composition of this invention is as follows in percentages by total weight.

| | |
|---|---|
| acid oligomer No. 1 (i) | 9.0 |
| epoxy polymer (ii) | 3.1 |
| microgel | 3.0 |
| melamine BM 9539 | 9.0 |
| screeners solution | 4.8 |
| nonaqueous dispersion No. 1 (iii) | 12.4 |
| RESIFLOW S | 0.2 |
| blocked DDBSA | 1.0 |
| silica dispersion | 4.5 |

-continued

| | |
|---|---|
| trimethylortho acetate (scavenge water) | 1.8 |
| dibutyltin dilaurate | 0.1 |
| 25% phosphonium | 0.1 |
| epoxy silane polymer (ii) | 29.4 |
| aromatic hydrocarbon solvent | 20.0 |
| n-butanol | 1.6 |

Example 6

The recipe for a coating composition employing no melamine crosslinker is as follows in percentages by total weight.

| | |
|---|---|
| acid oligomer No. 1 | 12.4 |
| epoxy polymer | 11.3 |
| microgel | 4.1 |
| screeners solution | 6.5 |
| nonaqueous dispersion No. 1 (iii) | 16.7 |
| RESIFLOW S | 0.3 |
| blocked DDBSA | 0.3 |
| silica dispersion | 6.1 |
| trimethylortho acetate (scavage water) | 2.4 |
| dibutyltin dilaurate catalyst | 0.1 |
| 25% phosphonium | 0.1 |
| epoxy silane polymer (ii) | 27.4 |
| aromatic hydrocarbon solvent | 11.8 |
| n-butanol | 0.5 |

We claim:

1. A stable, crack-resistant, one-package coating composition with a volatile organic content less than or equal to 4.2 pounds per gallon comprising a volatile organic solvent and a binder, the binder comprising, by weight of binder:
   (i) 2 to 35 percent of an organic compound having at least two acid groups and a weight average molecular weight of no more than about 2,000;
   (ii) 25 to 95 percent of a polymeric component having both epoxy and silane functionality and a weight average molecular weight between 1,500 and 50,000 comprising about 0.5 to 1.7 equivalents of epoxy per equivalent of acid in (i), the silane being at least 2 percent by weight of the binder; and
   (iii) 3 to 40 percent of an acrylic component comprising a core of acrylic polymer and, grafted thereto, a plurality of substantially linear stabilizer components; component (iii) containing at least about 2 percent of ethylenically unsaturated monomer with functionality capable of reacting with (i), (ii), or both (i) and (ii); the core being substantially insoluble and the stabilizer components being soluble in the solvent medium.

2. A composition according to claim 1 wherein compound (i) is the halfester acid oligomer formed by reaction of a monomeric anhydride and a hydroxyl finctional oligomer.

3. A coating composition according to claim 2 where the halfester acid oligomer is the reaction product of methyl-hexahydrophthalic anhydride and pentaeythritol.

4. A composition according to claim 1 wherein the polymeric component (ii) comprises polymerized units, in addition to glycidyl methacrylate and methacryloxypropyltrimethoxy silane, selected from at least one member of the group, alkyl methacrylates, alkyl acrylates and styrene, wherein the alkyl moiety contains 1 to 8 carbon atoms.

5. A composition according to claim 1 wherein the functional monomer of the acrylic component (iii) is selected from at least one member of the group hydroxyethyl acrylate, hydroxyproply acrylate, glycidyl methacrylate and glycidyl acrylate.

6. A composition according to claim 1 comprising from 5 to 15 percent of (i), from 60 to 80 percent of (ii) and from 15 to 25 percent of (iii).

7. A composition according to claim 1 comprising an additional epoxy-containing compound having glycidyl groups and having a weight average molecular weight less than 1500.

8. A composition according to claim 7 wherein the glycidyl component comprises a di- or polyglycidyl ether of a polyol of a di- or polyglycidyl ester of a carboxylic acid.

9. A composition according to claim 1 comprising an additional epoxy and silane functional compound of molecular weight less then 1500.

10. A substrate coated with a composition according to claim 1.

* * * * *